Aug. 29, 1944.   C. HOLLINGSWORTH   2,357,200
AIRCRAFT
Filed Sept. 23, 1943   2 Sheets-Sheet 1

INVENTOR.
Campbell Hollingsworth
BY
ATTORNEY

Aug. 29, 1944.  C. HOLLINGSWORTH  2,357,200

AIRCRAFT

Filed Sept. 23, 1943  2 Sheets-Sheet 2

INVENTOR.
Campbell Hollingworth
BY
ATTORNEY

Patented Aug. 29, 1944

2,357,200

UNITED STATES PATENT OFFICE 2,357,200

AIRCRAFT

Campbell Hollingsworth, New York, N. Y.

Application September 23, 1943, Serial No. 503,475

5 Claims. (Cl. 244—13)

This invention relates to new and useful improvements in aircraft.

More particularly, the invention proposes the construction of a new airplane which is characterized by a fuselage and wings of a certain design and construction mounted thereon.

The invention proposes the provision of front stationary wings mounted upon the sides of said fuselage, and much smaller rear wings adjustably mounted in a certain way.

The invention also proposes to characterize the fuselage with hollow strip-like members extended along the sides thereof and upon which the wings of said airplane are mounted.

Still further the invention proposes to provide said hollow strip-like members with slots at different elevations extended inwards from their back ends, and to mount the back wings in said slots in a certain way.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Figure 1:
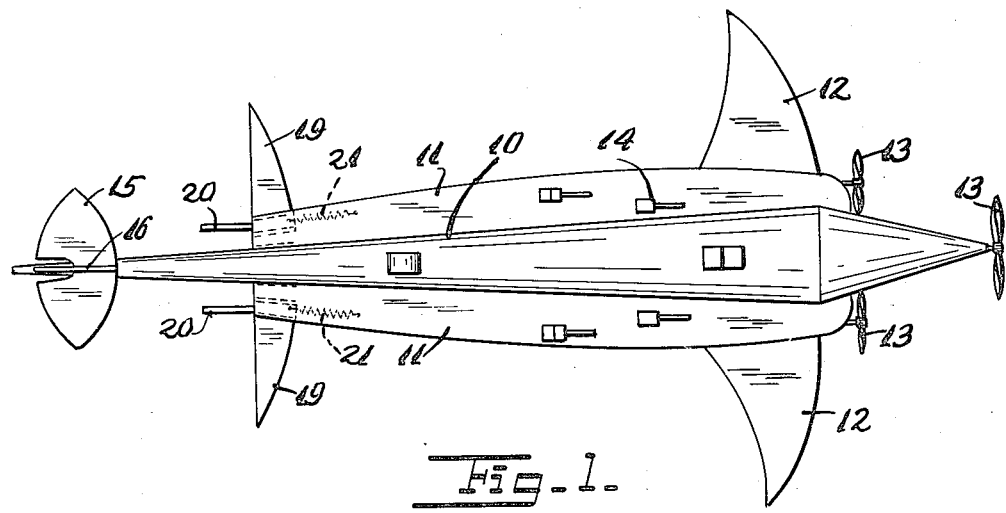
Fig. 1 is a plan view of an airplane constructed in accordance with this invention.
Figure 2:
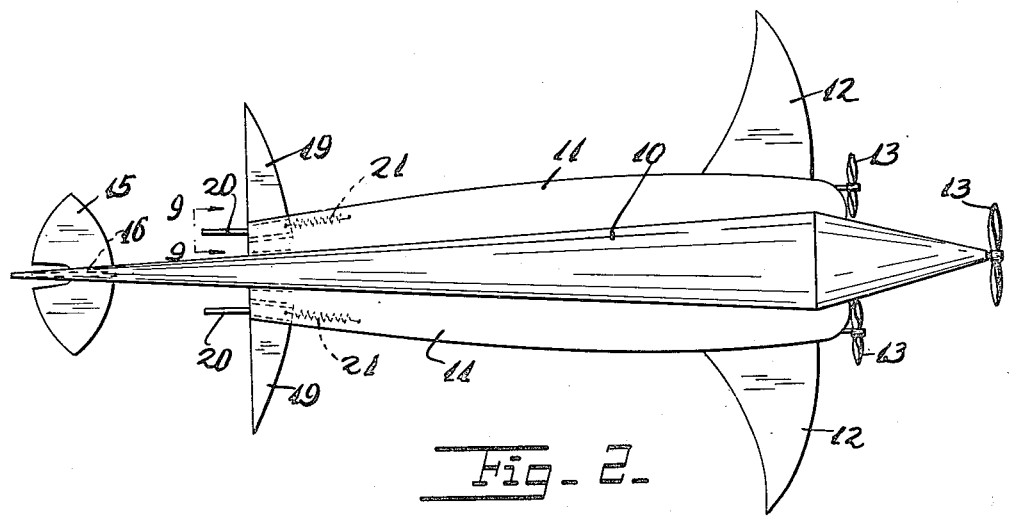
Fig. 2 is a bottom view of the airplane shown in Fig. 1.
Figure 6:
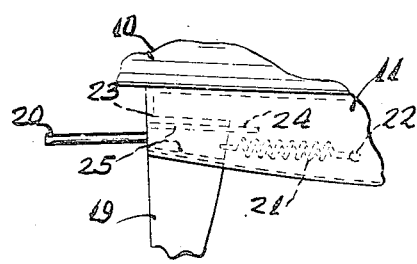
Fig. 6 is a fragmentary enlarged detailed view of a portion of Fig. 1 showing particularly the mounting of one of the rear wings.
Figure 3:
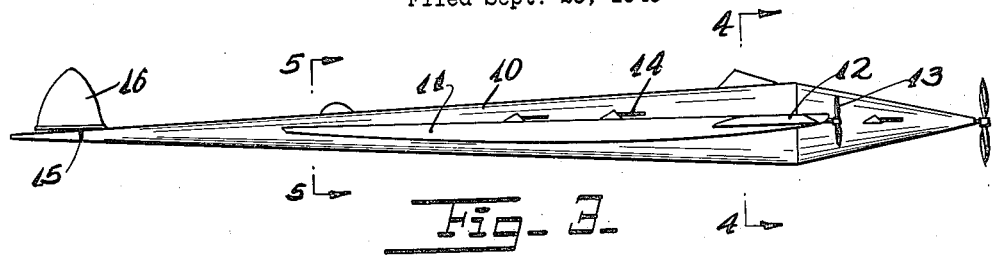
Fig. 3 is an elevational view of the airplane shown in Fig. 1.
Figure 4:
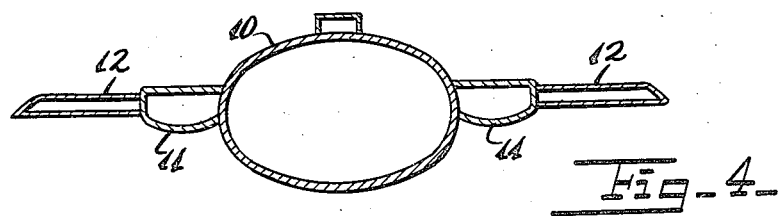
Fig. 4 is a vertical sectional view taken on the line 4—4 of Fig. 3.
Figure 5:
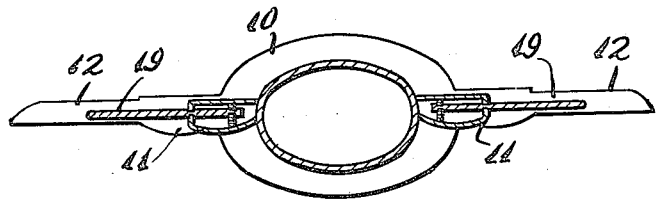
Fig. 5 is a sectional view taken on the line 5—5 of Fig. 3.
Figure 8:
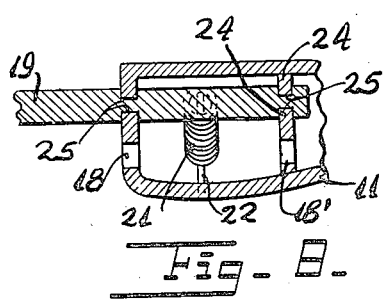
Fig. 8 is a fragmentary enlarged detailed view of a portion of Fig. 5 showing specifically the mounting of one of the rear wings.
Figure 7:
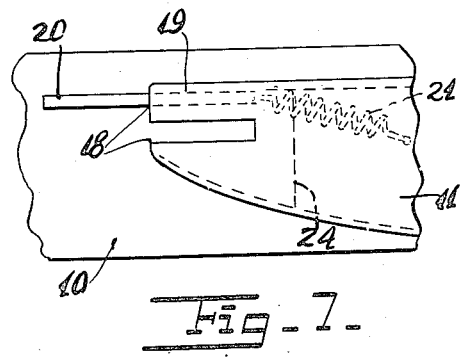
Fig. 7 is a fragmentary enlarged detailed view of a portion of Fig. 3 showing specifically the mounting of one of the rear wings.
Figure 9:
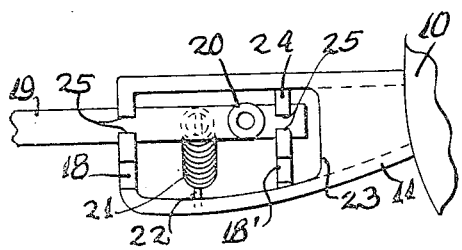
Fig. 9 is a fragmentary enlarged rear view looking in the direction of the line 9—9 of Fig. 2.

The new airplane, in accordance with this invention, included a fuselage 10 having hollow strip-like members 11 mounted along the sides thereof. Main front wings 12 are mounted upon and project from the front portions of said hollow strip-like members 10. A plurality of propeller driven motors 13 are mounted upon the front portion of the airplane. If the aircraft is to be used for warfare it is also provided with a plurality of guns 14. At the back, the aircraft is provided with the usual elevator 15 and rudder 16. Further details of the old construction of the airplane will not be given in this specification since they form no part of the invention and general aircraft designs are well known.

The back end portion of the hollow strip-like members 11, which are mounted upon the sides of the fuselage 10 are formed with a plurality of slots 18 at different elevations and extended inwards from the back and sides of the hollow strip-like members 11.

Small back wings 19 are slidably mounted through certain of said slots 18 and are disengageable from these slots and engageable in the other ones of said slots 18 for changing the elevation of said back wings 19 relative to the fuselage. Each back wing 19 is provided with a rearwardly extending handle 20 by which it may be conveniently moved. Each back wing 19 is urged into a forward position by resilient means acting between the wing 19 and the fuselage. This resilient means is in the nature of springs 21 connected with the inner end portions of the wings 19 and with stationary rods or pins 22 mounted through and upon said hollow strip-like members 11.

The back ends of the hollow strip-like members 11 are formed with openings 23 through which the inner ends of the wings 19 may pass. The back ends of said strip-like members 11 are also formed with guide partitions 24 having slots 18' aligned with the slots 18. Each wing 19 is formed with grooves 25 in its top and bottom faces adapted to engage the edge portions of the slots 18 and 18'. The purpose of the partitions 24 is to assist in supporting the wings 19.

As illustrated on the drawings, the back wings 19 are engaged in the uppermost slots 18 and 18'. When it is desired to change the flying characteristics of the plane it is merely necessary to draw the wings 19 rearwards so that the springs 21 are stretched and then to lower the wings 19 and engage them in the lower slots 18 and 18'. The wings 19 may be moved rearwards against the actions of the springs 21 by a crew with or without mechanical aid ganging up on the handles 20.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In an airplane, a fuselage, hollow strip-like members mounted upon the sides of said fuselage and having slots at different elevations extended inwards from their back ends, front wings mounted upon the front portions of said members, back wings slidably mounted through certain of said slots and engageable in the other of said slots, and resilient means releasably holding said back wings in position.

2. In an airplane, a fuselage, hollow strip-like members mounted upon the sides of said fuselage and having slots at different elevations extended inwards from their back ends, front wings mounted upon the front portions of said members, back wings slidably mounted through certain of said slots and engageable in the other of said slots, and resilient means releasably holding said back wings in position, said back wings being provided with grooves engaging the edges of said slots.

3. In an airplane, a fuselage, hollow strip-like members mounted upon the sides of said fuselage and having slots at different elevations extended inwards from their back ends, front wings mounted upon the front portions of said members, back wings slidably mounted through certain of said slots and engageable in the other of said slots, and resilient means releasably holding said back wings in position, the rear ends of said strip-like members being provided with openings through which the inner ends of said back wings may slide.

4. In an airplane, a fuselage, hollow strip-like members mounted upon the sides of said fuselage and having slots at different elevations extended inwards from their back ends, front wings mounted upon the front portions of said members, back wings slidably mounted through certain of said slots and engageable in the other of said slots, and resilient means releasably holding said back wings in position, the rear ends of said strip-like members being provided with openings through which the inner ends of said back wings may slide, and guide partitions mounted within the back portions of said strip-like members and formed with slots aligned with said first-named slots and cooperative with grooves upon the inner ends of said back wings for assisting in supporting said back wings.

5. In an airplane, a fuselage, hollow strip-like members mounted upon the sides of said fuselage and having slots at different elevations extended inwards from their back ends, front wings mounted upon the front portions of said members, back wings slidably mounted through certain of said slots and engageable in the other of said slots, and resilient means releasably holding said back wings in position, and comprising springs disposed within said strip-like members acting between said back wings and said strip-like members.

CAMPBELL HOLLINGSWORTH.